United States Patent
Charlot

(10) Patent No.: US 7,362,747 B2
(45) Date of Patent: Apr. 22, 2008

(54) TRANSLATION OF IDENTIFIERS OF USER INSTALLATION TERMINAL IN A PACKET NETWORK

(75) Inventor: Philippe Charlot, Lannion (FR)

(73) Assignee: France Telecom, Paris (FR)

( * ) Notice: Subject to any disclaimer, the term of this patent is extended or adjusted under 35 U.S.C. 154(b) by 724 days.

(21) Appl. No.: 10/344,126

(22) PCT Filed: Jul. 7, 2001

(86) PCT No.: PCT/FR01/02487

§ 371 (c)(1),
(2), (4) Date: Jul. 28, 2003

(87) PCT Pub. No.: WO02/13477

PCT Pub. Date: Feb. 14, 2002

(65) Prior Publication Data

US 2004/0090990 A1 May 13, 2004

(30) Foreign Application Priority Data

Aug. 8, 2000 (FR) .................................. 00 10493

(51) Int. Cl.
H04L 12/66 (2006.01)
(52) U.S. Cl. ...................... 370/352; 370/466; 370/401
(58) Field of Classification Search ................ 370/392, 370/389, 400, 401, 402, 475; 709/219, 226, 709/227, 228, 229
See application file for complete search history.

(56) References Cited

U.S. PATENT DOCUMENTS 5,793,763 A * 8/1998 Mayes et al. ................ 370/389

(Continued)

FOREIGN PATENT DOCUMENTS

EP 0840482 * 10/1997

(Continued)

OTHER PUBLICATIONS

Yeom et al. "IP Multiplexing by Transparent Port-Address Translator", Proceedings of the Systems Administration Conference, Sep. 29, 1996, pp. 113-121, XP002046289.*

(Continued)

*Primary Examiner*—Bob A. Phunkulh
(74) *Attorney, Agent, or Firm*—Lowe Hauptman Ham & Berner LLP

(57) ABSTRACT

To increase addressing capacity of terminals in a packet transmission network (RP) such as the Internet, the identifier (ITe) of a terminal (Te) having a predetermined format included in a network packet (PQ1) transmitted in a client installation (IC) is translated into a predetermined identifier (IPI) of the installation (IC) having said format and included in a network packet (PQ2) which is transmitted in the packet network (RP) to a telephone service provider server and into a port number (Pe1-Pe3) corresponding to the terminal identifier (ITe) and included in a transport packet encapsulated in the packet (PQ2) transmitted in the network, or vice versa. The port number can be allocated dynamically for steps during a call involving the terminal.

6 Claims, 3 Drawing Sheets

U.S. PATENT DOCUMENTS

| | | | |
|---|---|---|---|
| 6,038,233 A * | 3/2000 | Hamamoto et al. | 370/401 |
| 6,061,349 A * | 5/2000 | Coile et al. | 370/389 |
| 6,094,659 A * | 7/2000 | Bhatia | 707/104.1 |
| 6,101,552 A * | 8/2000 | Chiang et al. | 709/245 |
| 6,118,768 A * | 9/2000 | Bhatia et al. | 370/254 |
| 6,243,379 B1 * | 6/2001 | Veerina et al. | 370/389 |
| 6,389,462 B1 * | 5/2002 | Cohen et al. | 709/218 |
| 6,795,917 B1 * | 9/2004 | Ylonen | 713/160 |

FOREIGN PATENT DOCUMENTS

EP 0 840 482 A1 5/1998

OTHER PUBLICATIONS

Yeom et al; "IP Multiplexing by Transparent Port-Address Translator"; 1996 Lisa X—Sep. 29-Oct. 4, 1996—Chicago, Illinois.

* cited by examiner

TRANSLATION OF IDENTIFIERS OF USER INSTALLATION TERMINAL IN A PACKET NETWORK

REFERENCE TO RELATED APPLICATION

This application is a continuation of the PCT International Application No. PCT/FR01/02487 filed Jul. 27, 2001, which is based on the French Application No. 00-10493 filed Aug. 08, 2000.

BACKGROUND OF THE INVENTION

1. Field of the Invention

The present invention relates to processing identifiers, also called addresses, of user installation telephone terminals for telephone calls via a packet transmission network. To be more precise, the invention relates to transmitting voice over a high bit rate packet transmission network such as the internet network.

2. Description of the Prior Art

In telephone systems based on packet transmission networks, such as the internet network, it is necessary to identify in a biunivocal manner the various terminals served by the network so that they can send and receive telephone call packets. A single identifier, such as an Internet Protocol (IP) address, is associated with each terminal worldwide. If it is included as a destination address in a packet, the IP address is used to route the packet through the network.

The IPv4 address conforming to version 4 of the Internet Protocol contains 32 bits, i.e. 4 bytes, which represents only around four billion potential terminal identifiers. Because many addresses are already used by microcomputers to connect to the internet network, using the IPv4 address as a terminal identifier limits addressing capacity in the internet network. Consequently, this limited addressing capacity restricts expansion of access to the internet network to all telephone terminals to which telephone services based on packet transmission networks such as the internet should be available.

To remedy the shortfall of internet addressing capacity, a new protocol according to a version 6 is intended to expand IPv6 terminal addresses to 128 bits. The 128 bits of the IPv6 address can define a very large number of terminal identifiers, in fact approximately $3 \times 10^{38}$ potential identifiers. Although it is intended to encapsulate IPv4 addresses in IPv6 addresses to facilitate the transition between version 4 and version 6 of the internet protocol, there is at present no telephone terminal on the internet network designated by an IPv6 address.

It will be noticed that the invention does not relate to an address conversion between networks using the IPv4 protocol and the IPv6 protocol, as described in the patent application EP 0 840 482.

In telecommunication networks based on circuit switching, terminals connected directly to an access network are identified by the number of their access, such as a telecommunication line. When terminals are connected to an access network via a client installation, each terminal has a private identifier used only locally within the installation, and only the client installation is designated by a unique number enabling the installation to access the access network.

If the terminals of a client installation must be identifiable individually from outside the installation, it is necessary to allocate each of the terminals of the installation one identifier. For example, if a client digital telephone installation is connected to an integrated service digital network, the network operator can respectively allocate telephone numbers to the terminals of the client installation, which then becomes transparent in terms of addressing the terminals.

In telecommunication networks based on packet switching, for example the internet network, each terminal must be identified bijectively and therefore unambiguously in order for it to be able to dialog with other terminals or application servers via the packet transmission network. Each terminal must therefore have its own identifier to distinguish it from other terminals. The identifier of the terminal is uniquely defined worldwide to ensure consistency with the existing network.

For telephone services based on packet transmission networks, i.e. networks routing voice by means of packets, this bijective identification is particularly important. Because it must be possible to call a terminal at any time, its identifier must be known and validated by the packet network.

There are also client telecommunication installations in which terminals are connected by an intranet network based on the internet protocol and consequently have IP format private addresses respectively allocated to the terminal internally. To prevent addressing ambiguities, for example if the client installation must be connected to the internet network, a translator device is included at the installation access level for translating each IP private terminal address into a public terminal address so that each terminal of the installation can be addressed from outside the installation.

OBJECT OF THE INVENTION

An object of the present invention is to increase addressing capacity of terminals in a packet transmission network without modifying the format of the terminal identifiers included in packets in transit across the network, within the scope of the voice transmission across the packet network. In other words, the invention aims to provide, transparently with respect to the packet network, a single identifier for each terminal, especially for each telephone terminal, in a client telecommunication installation, without modifying the identifier of the installation, such as the IPv4 address of the installation known publicly by the network, while allowing a voice transmission from the terminal.

SUMMARY OF THE INVENTION

Accordingly, a method of translating identifiers of terminals in a client telecommunication installation, said identifiers having a predetermined format and being included in packets in transit through a packet transmission network, is characterized in that the identifier of a terminal included in a network packet transmitted in the client installation is translated into a predetermined identifier of the installation having said format and included in a network packet which is sent in the packet network to telephone service provider means and into a port number corresponding to the terminal identifier and included in a transport packet encapsulated in the network packet. Conversely, the predetermined identifier of the installation having said format and included in a network packet transmitted in the packet network to the installation and the port number included in the transport packet encapsulated in the network packet transmitted to the installation are translated into the identifier of the terminal included in a network packet transmitted to the terminal as well as in a communication step port number included in the transport packet encapsulated in the network packet transmitted to the terminal.

Translation of identifiers between the packet transmission network and the client telecommunication installation is effected in real time for all the packets sent and received by each terminal of the installation throughout the duration of each call involving the terminal. The translation is transparent with respect to the client installation and the packet transmission network, i.e. the format of the packets sent or received by each terminal of the installation and the packets sent or received by the telephone service provider means connected to the packet transmission network is not modified, which does not degrade the quality of service for the client. In particular, identifier translation processing causes no perceptible delay in transmitting packets.

Although a client has only one installation identifier, such as an IP address, and although all of the terminals of the installation can therefore be connected by only one access, such as a telephone line, leased line or data transmission line type client physical access, each of the terminals of the installation is advantageously addressable by a respective identifier from outside the installation, as if the client installation had the same number of "physical" access points to the network as the number of terminals.

Initially, at the time of connecting the terminal to the installation, the port number is a predetermined source port number independent of the terminal, and the service provider means allocates a respective port number to the terminal and transmits it as a destination port number to the installation.

During a call involving the terminal, after the terminal has been identified by transmitting the respective port number from the client installation to the telephone service provider means for an outgoing call, or from the service provider means to the installation for an incoming call, a port number designating a call step for any terminal of the installation and included in a transport packet encapsulated in a network packet which contains the identifier of the terminal and which is transmitted in the installation is translated into a port number allocated dynamically to the terminal and included in a transport packet encapsulated in a network packet which includes the identifier of the installation and which is transmitted in the packet transmission network to the service provider means in order to identify both the terminal and the step of the call involving the terminal, or vice versa.

At the end of a call involving the terminal, the port number allocated dynamically is available again for a call involving another terminal of the installation.

The invention also provides an identifier translator device carrying out the translation method according to the invention. The device is characterized in that it comprises a mapping table for matching the identifier of a terminal included in a network packet transmitted in the installation to a port number included in a transport packet encapsulated in a network packet transmitted in the packet network, and control means for replacing the terminal identifier in a network packet transmitted by the terminal with a predetermined identifier of the installation having said format and included in a network packet transmitted in the packet network and for replacing a communication step port number included in the transport packet which is encapsulated in the network packet transmitted by the terminal, with the port number included in the transport packet encapsulated in the network packet transmitted in the network. Conversely, the control means replaces the installation identifier in a network packet transmitted in the packet network to the installation and the port number included in the transport packet encapsulated in the above mentioned packet network by the identifier of the terminal included in a network packet transmitted to the terminal in the installation and by a call step port Accordingly, a method of translating identifiers of terminals in a client telecommunication installation, said identifiers having a predetermined format and being included in network packets in transit through a packet transmission network, is characterized in that:

the identifier of a terminal included as a source address in a first network packet transmitted from the terminal through the client installation is translated into a predetermined identifier of the installation having said format and included in a second network packet which is transmitted in the packet network to telephone service provider means, and a port number designating a voice call step involving the terminal and included in a transport packet encapsulated in the first network packet is translated into a port number allocated dynamically to the terminal and included in a transport packet encapsulated in the second network packet in order to identify both said terminal and the call step involving the terminal in the provider means, and conversely, the identifier of the installation included as a destination address in a third network packet which is transmitted in the packet network from the provider means to the installation through the packet network and the port number included in a transport packet encapsulated in the third network packet are translated respectively into the identifier of the terminal included in a fourth network packet transmitted to the terminal through the installation and the port number designating the voice call step and included in a transport packet encapsulated in the fourth network packet.

Translation of identifiers between the packet transmission network and the client telecommunication installation is effected in real time for all the packets sent and received by each terminal of the installation throughout the duration of each voice call involving the terminal. The translation is transparent with respect to the client installation and the packet transmission network, i.e. the format of the packets sent or received by each terminal of the installation and the packets sent or received by the telephone service provider means connected to the packet transmission network is not modified, which does not degrade the quality of service for the client. In particular, no delay resulting from identifier translation processing is perceptible in transmitting packets.

Although a client has only one installation identifier, such as an IP address, and although all of the terminals of the installation can therefore be connected by only one access, such as a telephone line, leased line or data transmission line type client physical access, each of the terminals of the installation is advantageously addressable by a respective identifier from outside the installation, as if the client installation had the same number of "physical" access points to the network as the number of terminals.

Initially, at the time of connecting the terminal to the installation, the port number in the second network packet is a predetermined source port number independent of the terminal, and the service provider means allocates a respective port number to the terminal and transmits it as a destination port number in the transport packet included in the third network packet to the installation.

During a call involving the terminal, after the terminal has been identified by transmitting the respective port number from the client installation to the telephone service provider means for an outgoing call, or from the service provider means to the installation for an incoming call, the port number associated with the terminal and included in a transport packet encapsulated in a network packet transmitted in the network is allocated dynamically for voice call steps involving the terminal and a remote terminal and under the control of the service provider means. The terminals can run in real time a telephone call via the packet network without degrading the quality of service for the clients in front of the terminals.

At the end of a call involving the terminal, the port number allocated dynamically is available again for a call involving another terminal of the installation.

In order to improve the voice retrieval in the terminal or the provider server, the identifier of the terminal and the port number designating a voice call step are also included in a data field of the first network packet and are translated respectively into the identifier of the installation and the port number allocated dynamically to the terminal which are also included in a data field of the second network packet, in the provider means, and conversely, the identifier of the installation and the port number allocated dynamically to the terminal are also included in a data field of the third network packet and are translated respectively into the identifier of the terminal and the port number designating a voice call step which are also included in a data field of the fourth network packet.

The invention also provides an identifier translator device carrying out the translation method according to the invention. The device is characterized in that it comprises a mapping table for matching the identifier of a terminal included in a network packet transmitted in the installation to a port number allocated dynamically and included in a transport packet encapsulated in a network packet transmitted in the packet network, control means for replacing the identifier of the terminal included as a source address in a first network packet transmitted by the terminal through the installation by a predetermined identifier of the installation having said format and included in a second network packet which is transmitted in the packet network to telephone service provider means and for replacing port number designating a voice call step involving the terminal and included in a transport packet encapsulated in the first network packet by a port number allocated dynamically to the terminal and included in a transport packet encapsulated in the second network packet, in order to identify both said terminal and the call step involving the terminal in the provider means, and control means for replacing the identifier of the installation included as a destination address in a third network packet which is transmitted in the packet network from the provider means to the installation through the packet network and the port number included in a transport packet encapsulated in the third network packet respectively by the identifier of the terminal included in a fourth network packet transmitted to the terminal through the installation and the port number designating the voice call step and included in a transport packet encapsulated in the fourth network packet.

The identifier translator device according to the invention serves as a "bridge" between the client installation telecommunication terminals and an access network to the installation. This bridge is completely transparent with respect to the processing of packets in transit across it between the client installation and the packet transmission network.

As will see hereinafter, the port number associated with a terminal and included in a transport packet encapsulated in a network packet transmitted in the network can be allocated either statically when registering the terminal with the service provider means or dynamically for call and data transmitting steps involving the terminal and a remote terminal and under the control of the service provider means.

BRIEF DESCRIPTION OF THE DRAWINGS

Other features and advantages of the present invention will become more clearly apparent on reading the following description of several preferred embodiments of the invention given with reference to the corresponding accompanying drawings, in which.

DESCRIPTION OF THE PREFERRED EMBODIMENTS

Figure 1:
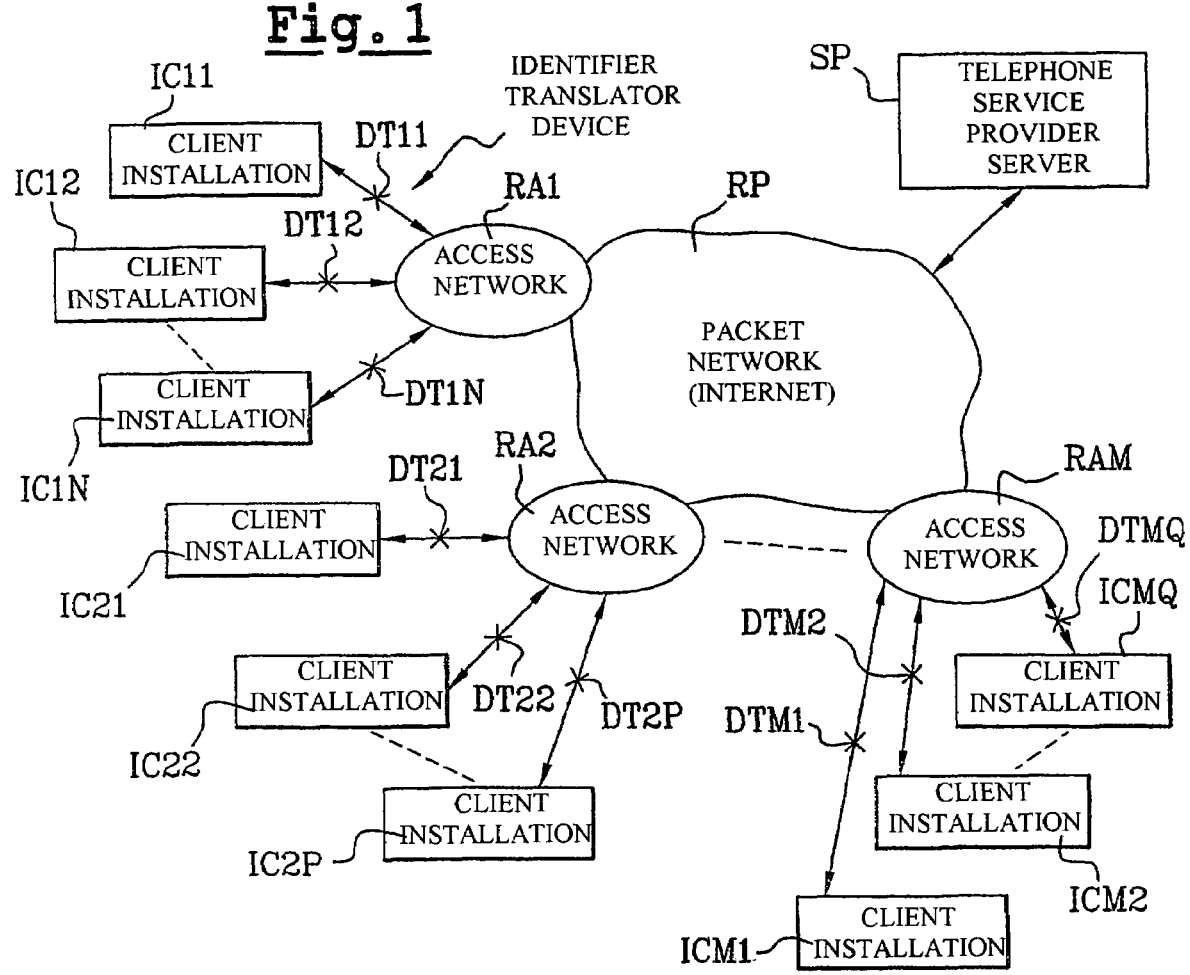
FIG. 1 is a block diagram of plural client telecommunication installations served by a packet transmission network to which a telephone service provider server is connected.

As shown diagrammatically in FIG. 1, the invention is described hereinafter in the context of relations between a telephone service provider server SP and client telecommunication installations via a high bit rate packet transmission network RP such as the internet, for example, to which the example refers hereinafter. FIG. 1 shows, by way of example, M access networks RA1, RA2, . . . , RAM for respectively providing client telecommunication installations IC11 to IC1N, IC21 to IC2P, . . . , ICM1 to ICMQ with access to the packet network RP, where M, N, P and Q are any integers. At least one of the access networks RA1 to RAM is for example an asymmetric digital subscriber line (ADSL) network, a cable network, a radio telephony network, or simply a switched telephone network RTC. The service provider server SP acts as a gateway between the terminals served by various access networks to offer client installation terminals telephone calls via the internet network RP and thus to have voice communications supported by packets in transit in the network RP. The access networks connect the client installations to the network RP via either permanent connections or on-demand connections.

For example a client telecomunication installation includes a few terminals T1 to TE connected directly to a telephone client line, leased line or data transmission line, served by a common telephone or radio telephone channel or arranged as a network via a server, for example as a private switching platform of type PABX. Each terminal Te, where e is an index lying between 1 and E, can be a conventional telephone terminal, a digital terminal such as a modem associated with a microcomputer or a facsimile machine, for example, or a DECT cordless telephone terminal served by a fixed base station.

As is known in the art, each client telecommunication installation IC is designated at the level of the packet network RP, and especially at the level of the internet network, by a respective unique identifier IPI, which generally comprises a number or a string of characters identifying the installation unambiguously. For the internet network constituting the packet network RP, the identifier is an IPv4 address comprising four bytes and conforming to version 4 of the internet protocol. In the prior art, if the telephone service provider server SP wishes to communicate directly with one of the terminals of a client installation, either this is impossible, because the private identifier of the terminal internal to the installation is inaccessible from outside the installation, or another but this time public IP address must be allocated to the terminal for the server SP to be able to communicate with it.

To eliminate these drawbacks, terminal identifier translator devices DT11 to DTLN, DT21 to DT2P, . . . , DTM1 to DTMQ are respectively break-connected between the installations IC11 to IC1N, IC21 to IC2P, . . . , ICM1 to ICMQ and the access networks RA1, RA2, . . . , RAM. The identifier translator devices are transparent with regard to the format of the packets, and more particularly with regard to the format of the source and destination addresses in the packets. Thus the packet network RP considers each identifier translator device as a client installation with no translator device, as in the prior art, and, reciprocally, each client telecommunication installation treats the packet network as if it were connected to it according to the prior art.

Figure 2:
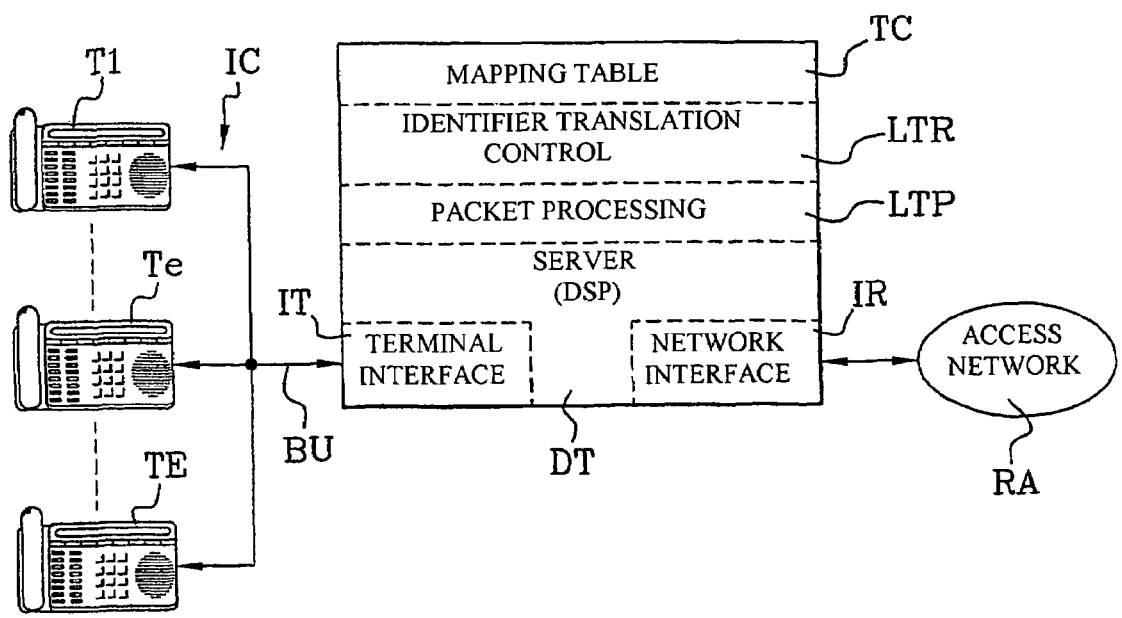
FIG. 2 is a block diagram of an identifier translator device according to the invention connected between a client installation and an access network.

By way of example, FIG. 2 shows the client telecommunication installation, which is designated by the reference IC in the remainder of the description and comprises telephone terminals T1, . . . , Te, . . . , TE connected by a common bus BU to a respective access network RA via a respective identifier translator device DT according to the invention.

In this preferred embodiment, the identifier translator device DT is housed in a computer server with two interfaces IT and IR. The interface IT connects the translator device DT to the telephone terminals T1 to TE of the client installation IC via the bus BU. The interface IR connects the translator device DT to the respective access network RA. The interfaces IT and IR are Ethernet interfaces, for example.

The translator device DT is implemented in a dedicated digital signal processor (DSP) integrated circuit, for example, essentially comprising two software layers LTP and LTR.

The first software layer LTP processes all packets for an incoming call or an outgoing call in the send direction from a terminal to the access network RA and in the receive direction from the access network RA to the terminal. In particular, the layer LTP decodes the data contained in packets relating to the events of a protocol call between a terminal and the telephone service provider server SP. These events are, for example, the detection of an incoming or outgoing call, or the recovery of the identifier of the calling party or the called party to the call, which can be one of the terminals T1 to TE of the installation or a remote telephone terminal. The software layer LTP also recalculates a checksum field CSR, CST calculated from the 16-bit words of the header ER, ET of a network packet or a transport packet (FIG. 4) because the header is modified by the translation process as will see hereinafter.

The second software layer LTR controls translation in real time of the identifiers contained in the packets passing through the translator device DT, i.e. sent and received by the interfaces IT and IR. The software layer LTR is associated with a mapping table TC relating to identifiers IT1 to ITE allocated internally to the terminals T1 to TE of the client installation IC and numbers of ports accessible by the service provider server SP from outside the installation. The software layer LTR loads and automatically updates lists of ports P11-P1J to PE1-PEJ allocated to the storage of terminals and dynamically to the terminals T1 to TE in the mapping table TC, where J is an integer and is typically equal to 5.

Figure 3:
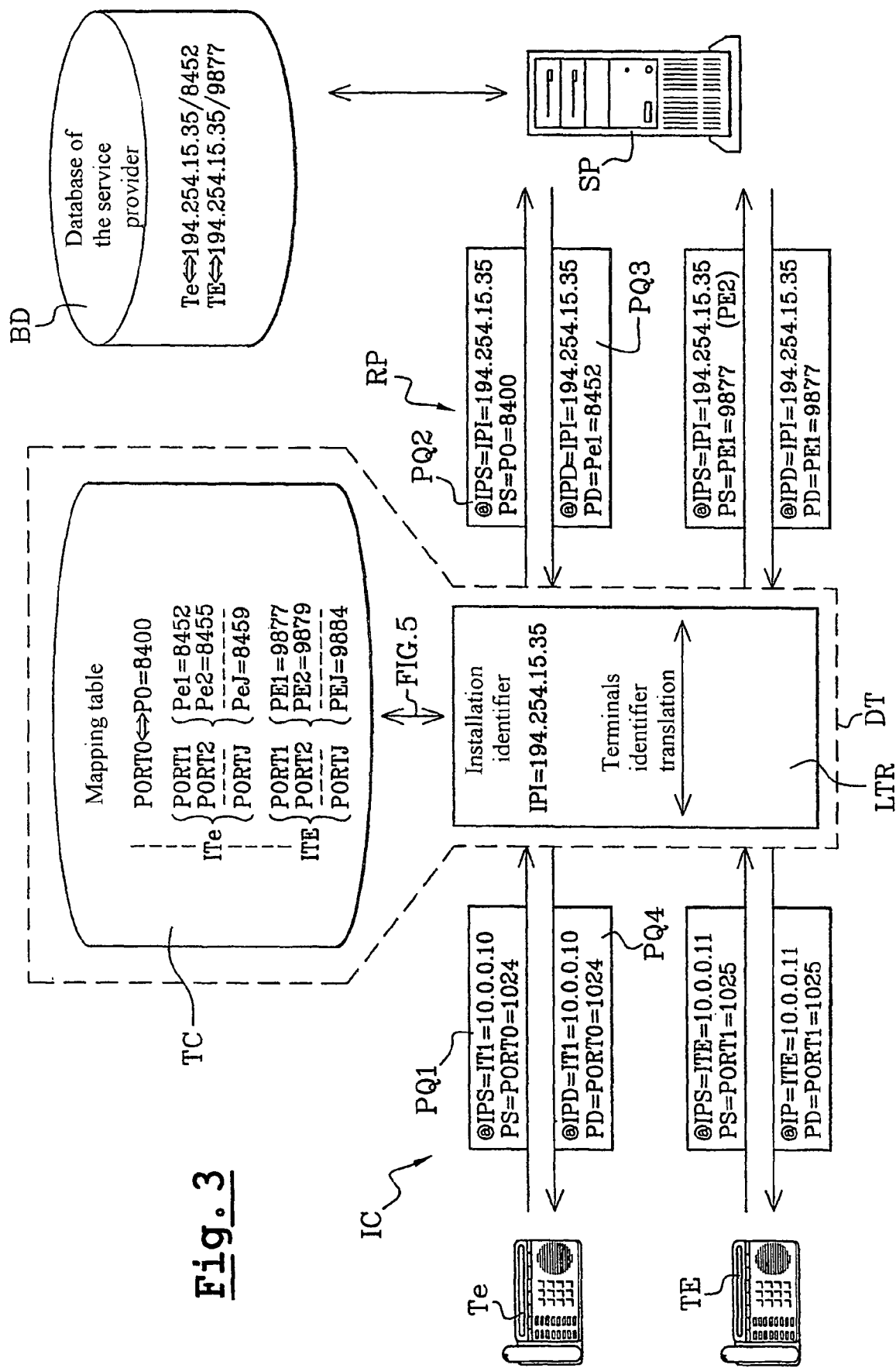
FIG. 3 is a transmitting diagram for packets between two client installation terminals and the service provider server via the translator device according to the invention.

An exchange of packets between one of the terminals of the client telecommunication installation IC, such as the terminal TE, and the telephone service provider server SP via the respective identifier translator device DT is illustrated in FIG. 3. In this figure, the translator device DT is indicated diagrammatically by the translation software layer LTR and the mapping table of TC, both of which are essentially involved in translating packet identifiers.

The identifier ITe of the terminal Te that is inaccessible from outside the installation IC and the identifier IPI of the installation IC that is accessible from outside the installation are IPv4 addresses such as "10.0.0.10" and "194.254.15.35". As already stated, at the link layer level the communication technique relies on Ethernet packets, and the network layer relies on the internet standards and protocols. To be more precise, the arrangement of the various layers for exchanging packets between the terminal Te and the server SP relies on H323 protocol standards whose transport layer relies either on the user datagram protocol UDP transport protocol to transmit IP packets relating in particular to voice during a telephone call or the transport control protocol TCP to transmit IP packets relating to signaling, especially at the start and at the end of a telephone call, as the TCP protocol, is more reliable than the UDP protocol and preserves at the receiver the order of the packets as sent, as well as resending lost packets.

The routers in the packet network RP use the bottom three layers of the ISO model and generally analyze only the headers of packets of the network layer 3 to route packets to their destination. Accordingly, the address IPI of the installation IC is used as a source address for routing a network packet from the translator device DT to the server SP or as a destination address for routing a network packet from the server SP to the installation IC.

Figure 4:
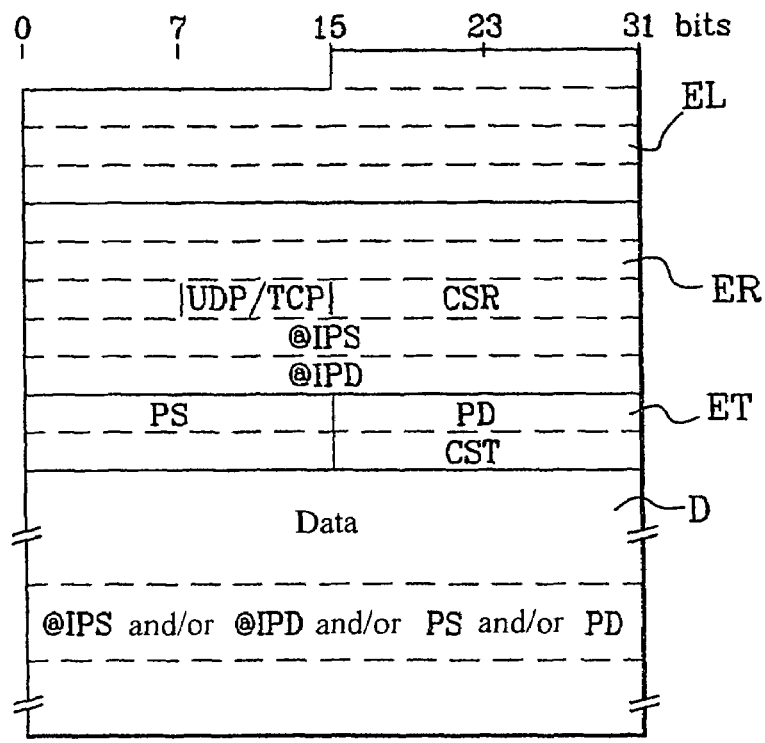
FIG. 4 shows diagrammatically the format of the headers of link, network and transport packets in transit via the translator device.

As shown in FIG. 4, a network protocol packet, referred to as a network packet and having a header ER, is encapsulated in a link protocol packet, referred to as a link packet and having a header EL which in this instance conforms to the Ethernet protocol and encapsulates a transport protocol packet, referred to as a transport packet, having a header ET. In the header ER of the network packet, a protocol byte indicates whether the UDP or TCP protocol is used by the transport packet with the header ET, four bytes designate the source address @IPS and four bytes designate the destination address @IPD.

In accordance with the invention, the address ITe of the terminal Te used as a source address or a destination address in a packet in transit in the installation IC between the terminal Te and the translator device DT corresponds to a source port number PS on two bytes or to a destination port number PD on two bytes in the header ET of a transport packet in transit between the transport device DT and the service provider server SP.

Furthermore, according to the H323 protocol, the data field D in a transport packet can encapsulate, at the application layer level, and in a redundant manner with respect to the headers ER and ET, all or part of the set of parameters @IPS, @IPD, PS and PD, as a function of the nature of the packet, so that the extremities, i.e. the terminal Te and the server SP in communication, can modify and/or utilize these parameters. The translation software layer LTR is therefore responsible not only for translating these parameters in the headers ER and ET but also in the data field D if these parameters are present.

In the remainder of the description, translating one of the above parameters necessarily involves translating that parameter in the corresponding header and that in the data field, if any.

Initially, in a step E0 of the identifier translation method according to the invention, the terminal Te declares itself to the telephone service provider server SP when the terminal Te is connected to the bus BU, i.e. when the terminal Te is connected to the server SP for the first time. The terminal Te transmits a first network packet PQ1 whose source address @IPS is equal to the identifier ITe of the terminal and whose source port number PS in the transport packet ET is a predetermined port number, for example 1024, indicating a phase of registration and authentication of any terminal with the server SP, and whose destination address is that of the server SP. The port number PORT0 and the other port numbers allocated dynamically to terminals according to the invention are chosen from the unallocated numbers, i.e. the numbers other than 0 to 1023, in accordance with the UDP or TCP protocol. The identifier translator device DT then converts the private terminal address ITe into the public address IPI of the installation and converts the port number PORT0 into a predetermined source port number P0 which is independent of the terminal and allocated on any terminal registration procedure by the service provider to signal a request to register the terminal. Thus the packet PQ1 is translated into a packet PQ2 whose source address @IPS is the installation address IPI and whose source port number PS is the predetermined port number P0, for example 8400, which designates a predetermined port number of the transport layer in the server SP.

When the packet PQ2 is received, it is applied to the port P0 in the server SP. The server SP allocates a respective port number Pe1 available in a database BD to the terminal Te which designates it explicitly in the installation IC. The server SP stores in memory the pair [IPI, Pe1] that the service provider uses to identify the terminal Te at the start of each call involving the terminal Te.

The service provider server SP acknowledges the registration and authentication of the terminal Te by forwarding a packet PQ3 to the installation IC designated by the address IPI. The packet PQ3 contains the address IPI as destination address @IPD and the terminal port number Pe1, for example 8452, as destination port number PD.

The translator device DT then carries out a process of converting identifiers that is the reciprocal of the previous one, by matching the pair [ITe, PORT1] to the pair [IPI, P11] using the mapping table TC in order to transmit the terminal Te on the bus BU a packet PQ4 including the address ITe and a predetermined port number PORT1 for validating registration as destination address and destination port number.

Thus the various terminals T1 to TE of the installation IPC are distinguished from outside the installation by port numbers P11 to P1E in the transport packets ET which can be considered as subaddresses of the addresses IT1 to ITE of the terminals in the installation.

Figure 5:
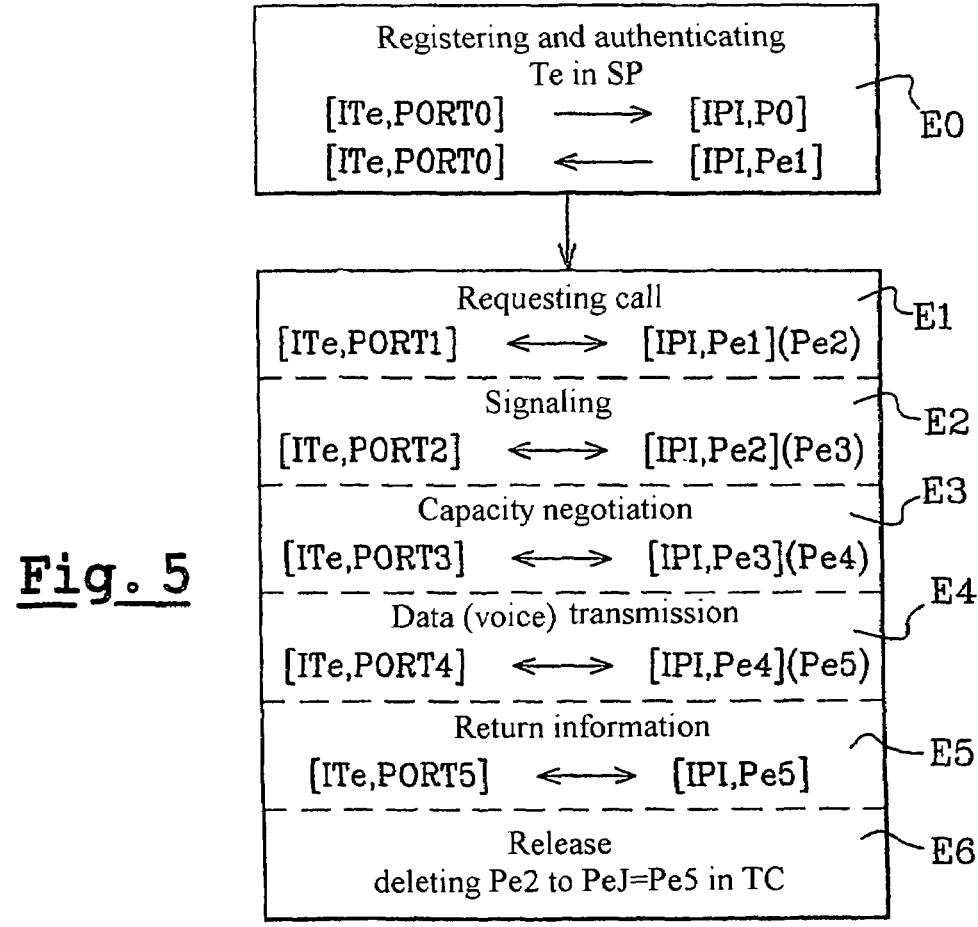
FIG. 5 is an algorithm of an identifier translation method according to the invention during the registration of a terminal and during setting up of a call involving the terminal.

FIG. 5 shows that the translation method broadly comprises J+1 steps E1 to E(J+1) during a call between the terminal Te and a remote terminal via the server SP. At the time of call set-up, either for an incoming call or for an outgoing call, step E1 declares a call and/or authentication request by means of an exchange of packets analogous to the exchanges of packets PQ1 to PQ4 previously described in order for the translator device DT to mark this call request by the mapping between the address ITe and the port number Pe1, to be more precise between the pair [ITe, PORT1] and the pair [IPI, Pe1]. For an incoming call, the server SP transmits a packet with the pair [IPI, Pe1] as the destination address @IPD and the destination port number PD; for an outgoing call, the terminal Te transmits a packet with the pair [ITe, PORT1] as the source address @IPS and the source port number PS.

In FIG. 3 step E1 is illustrated in relation to the terminal TE.

Then, in subsequent steps E2 to EJ, the layer LTR in the translator device dynamically and successively allocates to the terminal Te different port numbers Pe2 to PeJ that are still available and correspond to predetermined port numbers PORT2 to PORTJ relating to applications, i.e. to steps of the call in progress. For example, the dynamic allocation of port numbers by the translation control layer LTR can be analogous to the dynamic allocation of IP addresses under the DHCP dynamic host configuration protocol.

When received with the address ITe, the port number PORT2 corresponds to the port number Pe2 indicating signaling during setting up of the call in step E2. In practice, the port numbers PORT2 and Pe2 each have two values, namely a first value for designating signaling for an incoming call and a second value for designating signaling for an outgoing call in accordance with the Q.931/H225.0 protocol. The signaling concerns, for example, a preceding call in progress, connected terminals, putting a terminal on hold, etc. The port number PORT3, when it is sent in a packet with the terminal identifier ITe in step E3, corresponds dynamically to the port number Pe3 for negotiating terminal capacities with a view to transmitting audio and/or video data, for example under the H245 protocol. When it is transmitted in a packet with the identifier ITe, the port number PORT4 corresponds dynamically to the port number Pe4 for indicating a data stream of voice type in step E4 in accordance with the real time protocol (RTP) transport protocol. When it is sent in a packet with the identifier ITe in step EJ=E5, the port number PORTJ=PORT5 corresponds dynamically to the port number PeJ=Pe5 for indicating return information in accordance with the real time control protocol (RTCP) transport protocol. Examples of return information include loss of packets and acknowledgement of voice packets transmitted and not received in the other transmission direction in a preceding step E4. Pairs of steps E4 and E5 can succeed one another during a call for as long as there is data to be transmitted.

Accordingly, at a given time, for example when three terminals T1, Te and TE are communicating, the mapping table TC matches each of the sets of call steps [P11 to P15], [Pe1 to PeJ] and [PE1 to PEJ] to all of the predetermined port numbers [PORT1 to PORTJ] in each terminal.

The port numbers Pe2 to PeJ are allocated successively to the terminal Te as a function of their availability in the mapping table TC. Each port number Pej (2<j<J) is included in the data field of the packet during the preceding step E(j−1) for the server SP to follow the string of call steps.

Finally, the list of ports Pe2 to PeJ allocated dynamically is deleted from the mapping table TC by the control layer LTR on release, i.e. at the end of the call involving the terminal Te, in step E6, to make the ports Pe2 to PeJ available for calls involving other terminals of the installation.

The invention claimed is:

1. A method of translating identifiers of terminals in a client telecommunication installation, said identifiers having a predetermined format in packets in transit through a packet transmission network, the method comprising
including said identifiers in said packets in transit through said packet transmission network causing said identifier of a terminal as a source address in a first network packet transmitted from the terminal through the client installation to be translated into a predetermined identifier of the installation having said format and included in a second network packet which is transmitted in the packet network to telephone service provider device and causing a port number designating a voice call step involving the terminal and included in a transport packet encapsulated in the first network packet to be translated into a port number allocated dynamically to the terminal and included in a transport packet encapsulated in the second network packet in order to identify both said terminal and the call step involving the terminal in the provider device, and conversely, the identifier of the installation included as a destination address in a third network packet which is transmitted in the packet network from the provider device to the installation through the packet network and the port number included in a transport packet encapsulated in the third network packet to be translated respectively into the identifier of the terminal included in a fourth network packet transmitted to the terminal through the installation and the port number designating the voice call step and included in a transport packet encapsulated in the fourth network packet.

2. A method according to claim 1, wherein, at the time of connecting the terminal to the installation, causing (a) the port number in the second network packet to be a predetermined source port number independent of the terminal, and (b) the service provider device to allocate a terminal port number to the terminal and transmit said terminal port number to the installation as a destination port number in the transport packet included in the third network packet.

3. A method according to claim 1, further including causing the allocated port number dynamically to be again available at the end of said call step involving the terminal.

4. A method according to claim 1, wherein the identifier of the terminal and the port number designating a voice call step are also included in a data field of the first network packet and causing the identifier of the terminal and the port number designating a voice call step to be translated respectively into the identifier of the installation and the port number allocated dynamically to the terminal which are also included in a data field of the second network packet, and conversely, causing the identifier of the installation and the port number allocated dynamically to the terminal to be included in a data field of the third network packet and be translated respectively into the identifier of the terminal and the port number designating a voice call step which are also included in a data field of the fourth network packet.

5. A device for translating identifiers of terminals in a client telecommunication installation, said identifiers being arranged to have a predetermined format and be included in packets in transit through a packet transmission network, the device comprising a mapping table for matching said identifier of one of said terminals included in a network packet adapted to be transmitted in the installation to a dynamically allocated port number adapted to be included in a transport packet encapsulated in a network packet adapted to be transmitted in the packet network, a controller arrangement for: (a) replacing the identifier of the terminal included as a source address in a first network packet adapted to be transmitted by the terminal through the installation by a predetermined identifier of the installation having said format and included in a second network packet which is adapted to be transmitted in the packet network to a telephone service provider device and for replacing a port number designating a voice call step involving the terminal and included in a transport packet encapsulated in said first network packet by a port number allocated dynamically to the terminal and included in a transport packet adapted to be encapsulated in the second network packet, in order to identify both said terminal and the call step involving the terminal in the provider device, and (b) replacing the identifier of the installation adapted to be included as a destination address in a third network packet which is adapted to be transmitted in the packet network from the provider device to the installation through the packet network and the port number adapted to be included in a transport packet encapsulated in the third network packet respectively by the identifier of the terminal included in a fourth network packet transmitted to the terminal through the installation and the port number adapted to designate the voice call step and adapted to be included in a transport packet encapsulated in the fourth network packet.

6. A device according to claim 5, wherein the control means is arranged to delete the port numbers dynamically allocated in the mapping table at the end of said call step involving the terminal.

* * * * *

UNITED STATES PATENT AND TRADEMARK OFFICE
CERTIFICATE OF CORRECTION

PATENT NO. : 7,362,747 B2
APPLICATION NO. : 10/344126
DATED : April 22, 2008
INVENTOR(S) : Philippe Charlot It is certified that error appears in the above-identified patent and that said Letters Patent is hereby corrected as shown below:

On the Title Page, Item (22) should read,
PCT Filed: July 27, 2001

Signed and Sealed this

Eighth Day of July, 2008

JON W. DUDAS
*Director of the United States Patent and Trademark Office*